US011142096B2

(12) United States Patent
Onoyama (10) Patent No.: US 11,142,096 B2
(45) Date of Patent: Oct. 12, 2021

(54) VEHICLE (71) Applicant: HONDA MOTOR CO., LTD., Tokyo (JP)

(72) Inventor: Mayumi Onoyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 204 days.

(21) Appl. No.: 16/507,534

(22) Filed: Jul. 10, 2019

(65) Prior Publication Data
US 2020/0039388 A1 Feb. 6, 2020

(30) Foreign Application Priority Data

Aug. 6, 2018 (JP) .............................. JP2018-147506

(51) Int. Cl.
B60N 2/02 (2006.01)
B60N 2/01 (2006.01)
B60N 2/30 (2006.01)
B60N 3/02 (2006.01)
G05D 1/02 (2020.01)

(52) U.S. Cl.
CPC ............. B60N 2/0292 (2013.01); B60N 2/01 (2013.01); B60N 2/3097 (2013.01); B60N 3/02 (2013.01); G05D 1/021 (2013.01); G05D 2201/0212 (2013.01)

(58) Field of Classification Search
CPC ...... B60N 2/0292; B60N 2/01; B60N 2/3097; G05D 1/021

USPC ..................... 296/64, 65.03, 65.09, 65.13, 69
See application file for complete search history.

(56) References Cited

U.S. PATENT DOCUMENTS

| 2,556,076 | A | * | 6/1951 | Evans | ................ | B64D 11/0641 5/9.1 |
| 3,868,143 | A | * | 2/1975 | Reilly | .................. | B60N 2/4242 297/216.17 |
| 4,489,972 | A | * | 12/1984 | Monzini | .................. | B60N 2/01 296/181.1 |
| 8,636,154 | B2 | * | 1/2014 | Chinn | .................. | A61G 3/0841 211/103 |
| 8,801,099 | B2 | * | 8/2014 | Ebel | ........................ | B63B 29/06 297/277 |
| 8,991,760 | B2 | * | 3/2015 | Amante | ............... | B60N 2/4242 244/122 R |
| 10,654,425 | B2 | * | 5/2020 | Takamura | .............. | B62D 31/00 |
| 2007/0170742 | A1 | * | 7/2007 | Hansen | ................ | B60N 2/4242 296/64 |
| 2019/0016287 | A1 | * | 1/2019 | Amidon | .................... | B60P 3/03 |
| 2020/0039386 | A1 | * | 2/2020 | Takamura | .............. | B60N 3/063 |

FOREIGN PATENT DOCUMENTS

JP 2017039400 A 2/2017

* cited by examiner

Primary Examiner — D Glenn Dayoan
Assistant Examiner — E Turner Hicks
(74) Attorney, Agent, or Firm — Armstrong Teasdale LLP (57) ABSTRACT A vehicle provides a comfortable space for a wide range of passengers. The vehicle (1) includes a plurality of seats (31) arranged in a fore and aft direction in laterally middle part of a cabin (5) of the vehicle, each seat facing laterally outward. Each seat is provided with a seat cushion (32) that can be flipped up around a laterally inner edge thereof.

10 Claims, 7 Drawing Sheets

VEHICLE

TECHNICAL FIELD

The present invention relates to a vehicle, and in particular to a vehicle with a novel seat arrangement.

BACKGROUND ART

In an autonomous driving vehicle, the driver is not required to be facing forward at all times, and therefore, the front seat may be selectively turned rearward so as to face the rear seat. See JP2017-039400A, for instance. Thus, the introduction of autonomously driving vehicles has created new possibilities for seat arrangement.

Also, ride share is receiving a growing attention from the view point of reducing traffic congestion and $CO_2$ emission. In a ride share, groups of people sharing common destinations share common vehicles. Oftentimes, people sharing a ride may be strangers to one another. Therefore, some consideration may be desired in seating the people sharing the ride so as to maximize privacy and minimize stress. On the other hand, people sharing the ride may know one another. In such a case, it may be desired that the passengers are seated so as to facilitate mutual conversation.

SUMMARY OF THE INVENTION

In view of such a problem of the prior art, a primary object of the present invention is to provide a vehicle that can provide a comfortable space for a wide range of passengers.

To achieve such an object, one embodiment of the present invention provides a vehicle (1) comprising a plurality of seats (31) arranged in a fore and aft direction in laterally middle part of a cabin (5) of the vehicle, each seat facing laterally outward, wherein each seat is provided with a seat cushion (32) that can be flipped up around a laterally inner edge thereof.

Thereby, each passenger can choose to sit on the seat cushion in the normal seating position, or lean against or sit on the extension of the seat cushion in the flipped-up position. In addition, a space for placing luggage can be created on the outboard side of each seat cushion which is in the flipped-up position. In this manner, each passenger can use the space in the cabin so as to meet the need of the passenger.

Preferably, the seats are arranged in two rows positioned laterally next to each other, and each seat cushion is provided with an extension (35) depending from a laterally outer edge thereof.

Since the passenger who is leaning against the extension of the seat cushion in the tipped-up position is spaced from another passenger who is occupying the laterally adjacent seat owing to the presence of the extension, the two passengers occupying the laterally adjacent seat cushions are enabled to maintain a comfortable distance between them.

Preferably, each seat cushion is supported by a pole (36) extending from a floor to the seat cushion.

Thereby, the seat cushion occupies a minimum floor space, and can be secured to the vehicle body in a highly secure manner. Furthermore, an upper part of the pole may be conveniently used as a hand rail for the passenger to hold onto. If desired, the pole (36) may be detachably attached to the floor so that the corresponding seat cushion and the pole can be selectively removed from the cabin so that an extra floor space may be created.

Alternatively, each seat cushion is supported by a pole (37) extending between a floor and a roof of the cabin.

Thereby, each seat occupies a minimum floor space, and defines a vacant space under the seat cushion in the seating position. When the seat cushion is flipped up, an available space can be created in the area immediately outboard of the seat cushion so that the usable space on the floor can be maximized. If desired, the pole (37) may be detachably attached to the floor and the roof so that the corresponding seat cushion and the pole can be selectively removed from the cabin so that an extra floor space may be created.

Preferably, the vehicle further comprises a pole (38) extending between a floor and a roof of the cabin, the pole being detachably attached to the floor and the roof.

The pole may be used as a hand rail for the passenger to hold onto when the pole is in place, and a large space for luggage, passengers and wheelchairs may be created when the pole is removed.

Preferably, the pole is provided between the seat cushions that adjoin each other in the fore and aft direction.

Thereby, the passenger is enabled to be seated and unseated without being hampered by the pole. Also, the pole is positioned conveniently for the passenger seating on or leaning against the seat cushion to hold on.

Preferably, the pole is configured to be selectively positioned in a first position and a second position located on a laterally outer side of the first position.

Thereby, the position of the pole can be optimized for the passenger occupying the seat cushion to hold on without regard to the stature of the passenger.

The vehicle of the present invention can be advantageously applied to an autonomous driving vehicle.

Thus, according to the above configuration, there is provided a vehicle that can provide a comfortable space for a wide range of passengers.

DESCRIPTION OF THE PREFERRED EMBODIMENT(S)

Preferred embodiments of the present invention are described in the following with reference to the appended drawings.

Figure 1:
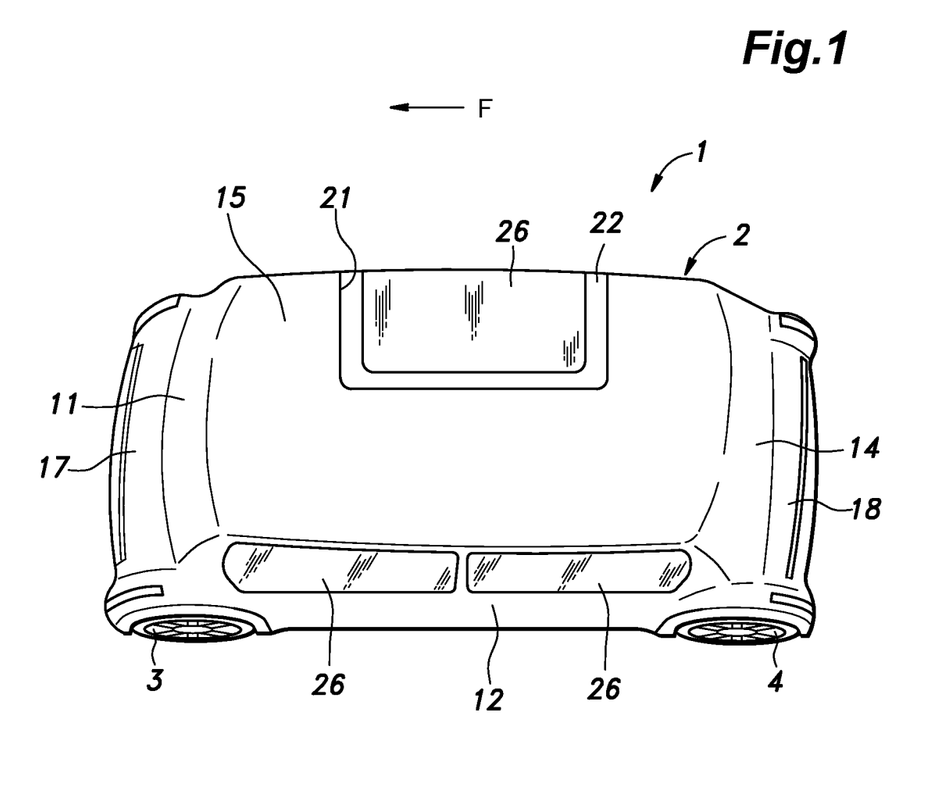
FIG. 1 is a perspective view of a vehicle according to a first embodiment of the present invention as viewed from an upper left direction.
Figure 2:
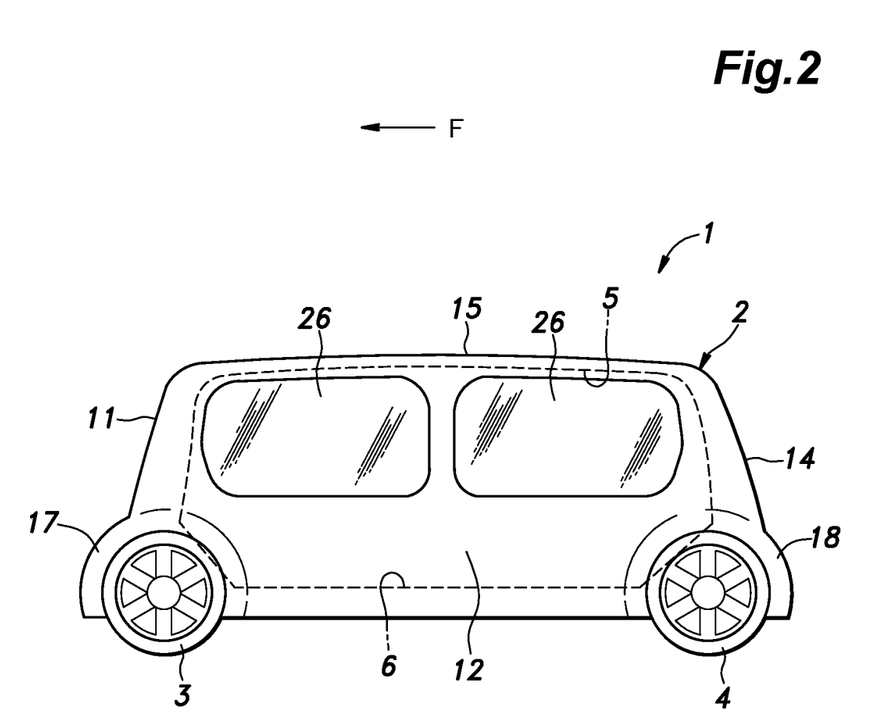
FIG. 2 is a left side view of the vehicle.
Figure 3:
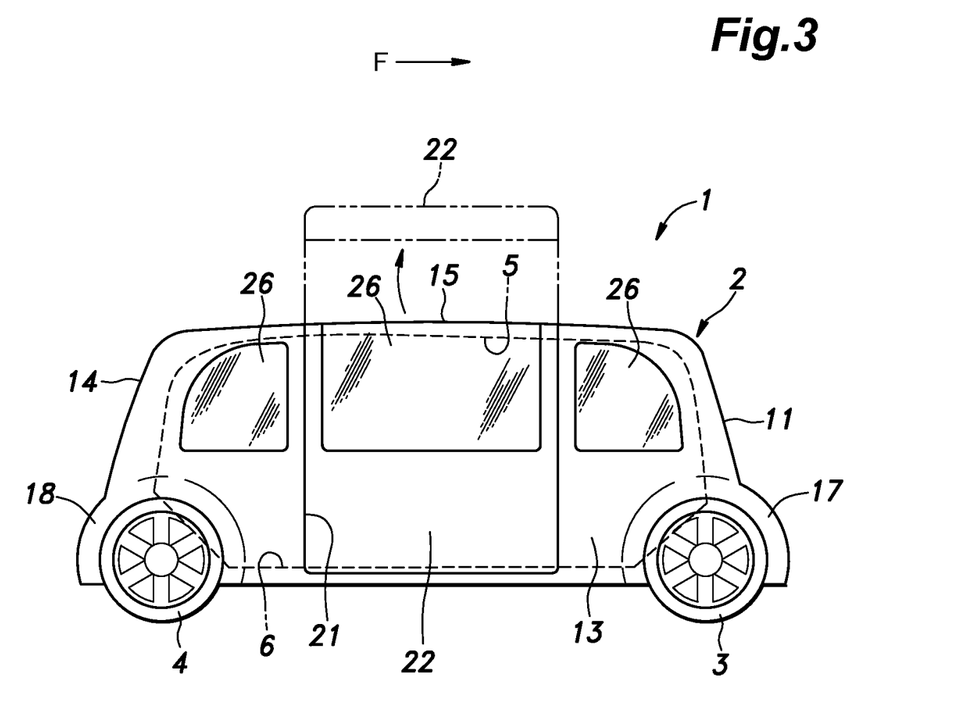
FIG. 3 is a fight side view of the vehicle.

As shown in FIGS. 1 to 3, a vehicle 1 according to a first embodiment of the present invention consists of a four-wheeled vehicle. The vehicle 1 has a substantially rectangular vehicle body 2 elongated in the fore and aft direction. The vehicle body 2 is provided with a pair of front wheels 3 and a pair of rear wheels 4. The vehicle 1 may consist of an autonomous vehicle that does not require a driver.

As shown in FIGS. 1 to 4, a central part of the vehicle body 2 defines a substantially rectangular cabin 5 which is elongated in the fore and aft direction. The cabin 5 is defined by a floor 6, a front wall 11 extending laterally and vertically along a front edge of the floor 6, a left wall 12 extending rearward from the left edge of the front wall 11, a right wall 13 extending rearward from the right edge of the front wall 11, a rear wall 14 extending between the rear edges of the left wall 12 and the right wall 13, and a roof 15 connected to the upper edges of the front wall 11, the left wall 12, the right wall 13 and the rear wall 14.

A drive source such as an electric motor and an internal combustion engine, and a control unit such as an ECU are mounted either in a front part 17 of the vehicle body 2 located ahead of the front wall 11 or in a rear part 18 of the vehicle body 2 located behind the rear wall 14. The remaining available space in the vehicle front part 17 and the vehicle rear part 18 may be used as a luggage stowage space.

The right wall 13 is provided with a door opening 21 which is fitted with a door 22 for selectively closing the door opening 21. The door opening 21 extends from the lower end of the right wall 13 to a middle part of the roof 15. The door 22 in this embodiment consists of a gull-wing door, and is supported by the roof 15 at an upper end so as to be rotatable about a rotational axis extending in the fore and aft direction. Alternatively, the door 22 may consist of a regular swing door or a slide door. Windows 26 each fitted with a glass pane are provided in the remaining parts of the right wall 13 located ahead of and behind the door 22, in an upper part of the door 22, and in a large part of the left wall 12. For example, the vehicle 1 can be used as a means of transportation in a shopping mall, between terminals of an airport, or between a terminal and an airplane at an airport.

Figure 4:
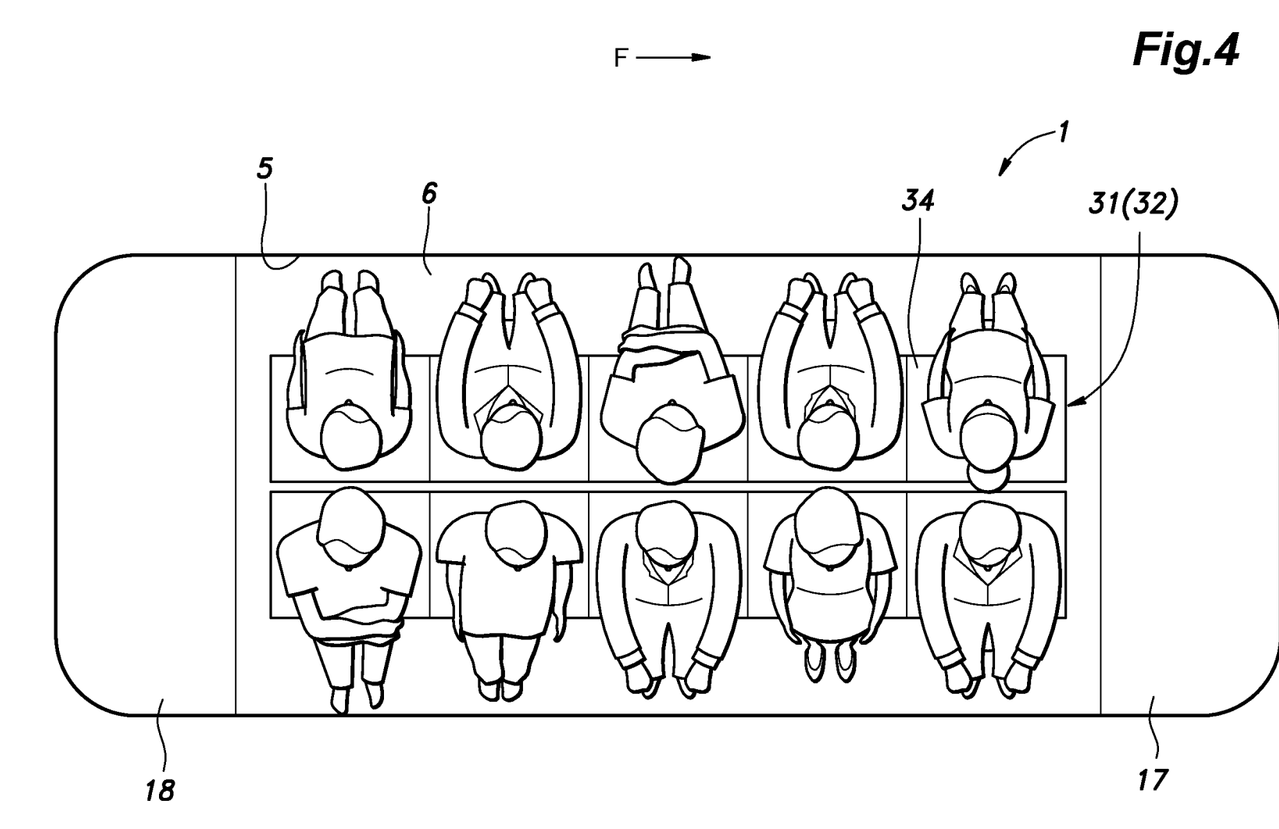
FIG. 4 is a see-through plan view of a cabin of the vehicle with passengers seating on seats in the cabin.

As shown in FIG. 4, two rows of seats 31 extending in the fore and aft direction are arranged laterally one next to the other in the cabin 5, each row including five seats 31 which all face in the outboard direction. In this embodiment, the seats 31 are not provided with seat backs. In an alternate embodiment, a common seat back or individual seat backs are provided between the two rows of seats 31.

Figure 5:
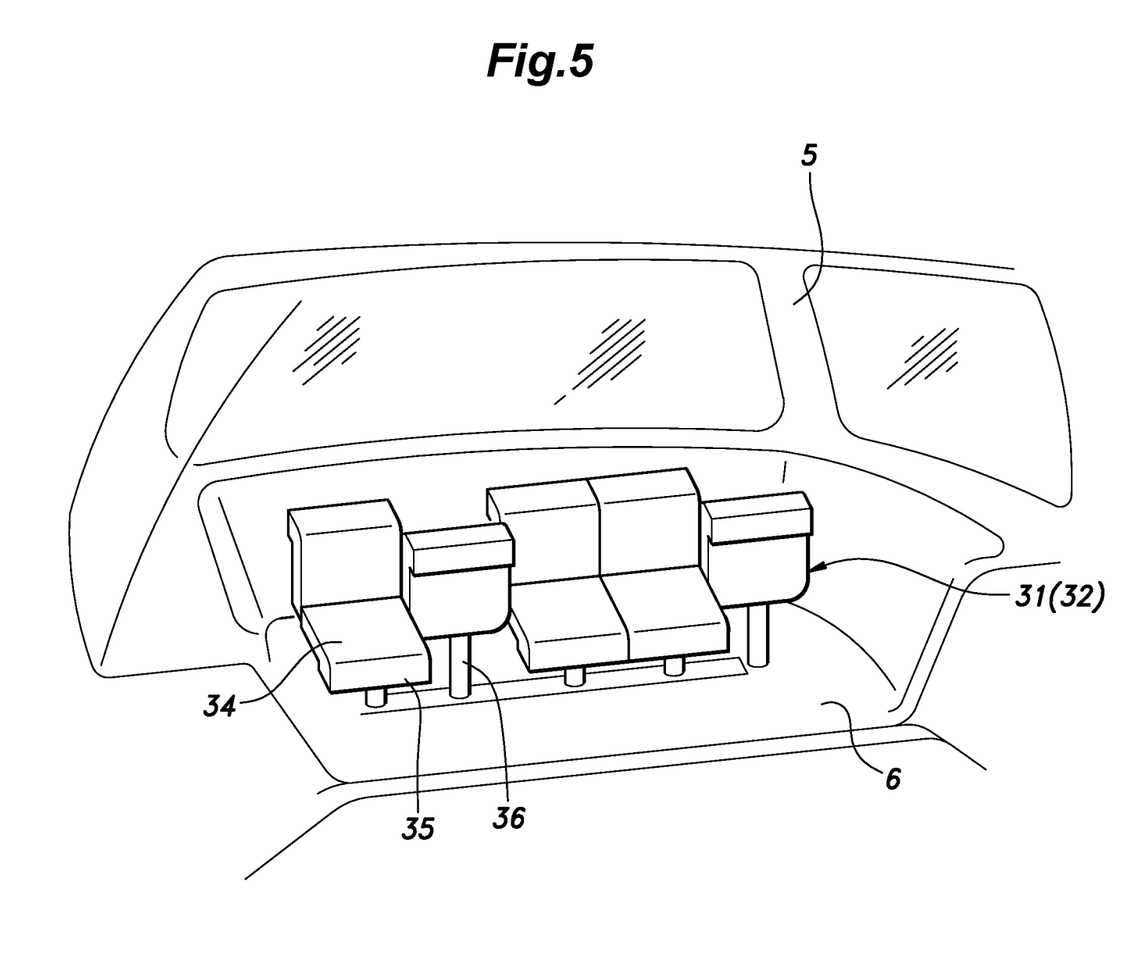
FIG. 5 is a see-through perspective view of the cabin as viewed from an upper left front direction.

As shown in FIG. 5, the seat cushion 32 can be flipped up and down about a rotational axis extending laterally at a base end part (or rear end part) thereof between a seating position where a seating surface 34 of the seat cushion 32 faces substantially upward, and a flipped-up position where the seat cushion 32 extends substantially vertically (with the seating surface 34 facing in the inboard direction). In the illustrated embodiment, the angle between these two positions is about 90 degrees. Each seat cushion 32 is provided with an extension 35 depending from the outboard edge (front edge) thereof by a prescribed length which is substantially shorter than the length (as measured between the rear edge and the front edge) of the seat cushion 32. The extension 35 extends in the widthwise direction along the front edge of the seat cushion 32, and forms an angle of about 90 degrees with respect to the seating surface 34. The extension 35 may be contoured so as to define a curved profile for aesthetic reason or for the comfort of the passenger occupying the seat cushion 32. Per se known mechanisms may be provided in each seat so as to latch the seat cushion 32 in the respective positions and/or bias the seat cushion 32 toward either of the two positions.

Each seat cushion 32 is provided with a frame providing a structural rigidity of the seat cushion 32, a pad providing a sitting comfort to the seat cushion 32, and a skin member covering the pad and the frame. The frame preferably extends into the extension 35 so that the extension 35 may be able to withstand the load applied thereto when a passenger sits on the extension 35 in the flipped-up position of the seat cushion 32.

When the seat cushion 32 is placed in the seating position, the passenger can sit on the seating surface 34 of the seat cushion 32. The height of the seating surface 34 in the seating position is set so that a passenger of standard height can sit on the seating surface 34 with the soles resting on the floor 6 and the knees and pelvic joints bent by approximately 90 degrees. When the seat cushion 32 is placed in the flipped-up position, the passenger can either lean on the extension 35 while standing or sit on the extension 35 as on a high bar stool. People may find it more comfortable, particularly when the time duration aboard the vehicle is short, to stay standing up, to lean against something, or sit on a high chair or stool, more than seating in a regular seat or a chair.

When a passenger leans against the extension 35 with the seat cushion 32 positioned in the flipped-up position, since the passenger stands at a position more outboard than a position at which the passenger would stand if no extension 35 were provided, the passenger is relatively spaced apart from a passenger either seating on or leaning against the seat of the adjacent row.

Since less space is occupied when the seat cushion 32 is flipped up than when the seat cushion 32 is in the normal seating position, a space for placing a relatively large luggage such as a suitcase can be made available to the passenger who chooses to flip up the seat cushion 32, and stands next to the seat or leans against the extension 35 of the seat cushion 32. Typically, the luggage would be placed on the outboard side of the passenger. If there is any vacant seat, the passenger may flip up the seat cushion 32 of the vacant seat, and may sit on a seat placed in the seating position near the flipped up seat.

In the illustrated embodiment, each seat 31 is supported on the upper end of a support pole 36 extending upward from the floor 6 as shown in FIG. 5. Preferably, laterally aligned seats 31 in the different rows may be supported by a common support pole 36 which is located adjacent to the inboard edges of the two seats 31 so that some space is created under each seat cushion 32 in the seating position, and some space is created on the outboard side of each seat cushion 32 in the flipped-up position. At least one of the support poles 36 may be detachably attached to the floor 6 so that the support pole 36 along with the seat cushion 32 may be removed from the cabin 5. Thereby, extra space can be created for placing luggage or a wheel chair, as required.

Figure 6A:
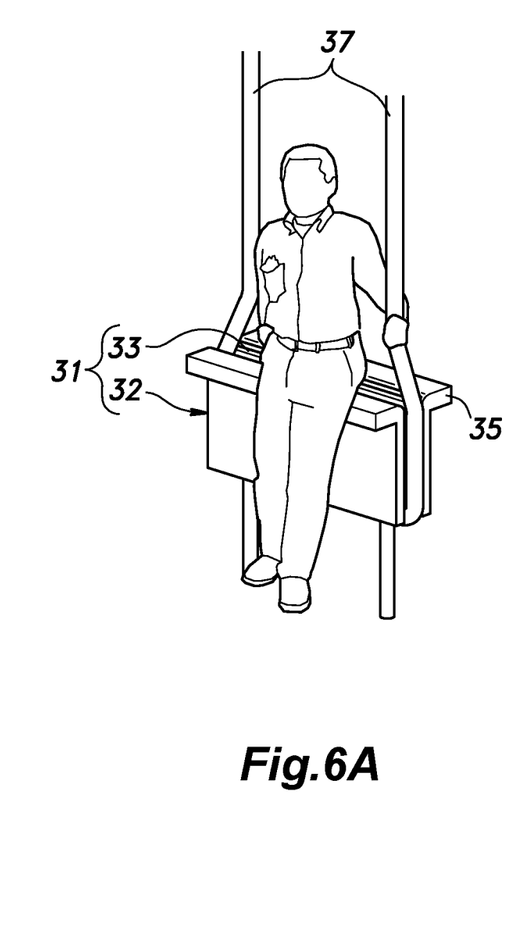
FIG. 6A is a fragmentary view of seats of a second embodiment of the present invention.
Figure 6B:
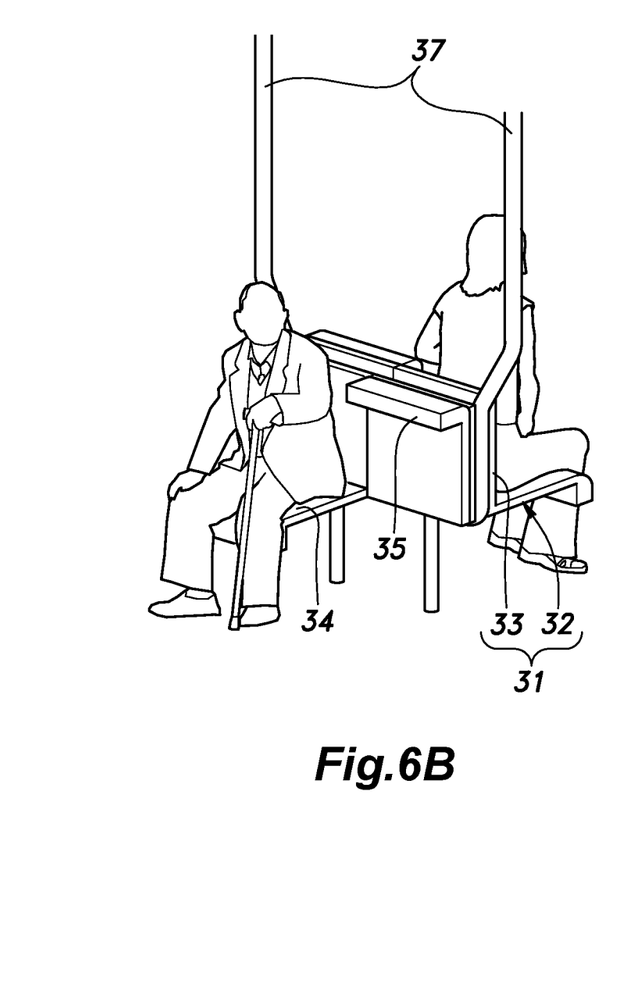
FIG. 6B is a fragmentary view of other seats of the second embodiment.

FIGS. 6A and 6B show a second embodiment of the present invention. In this case, a plurality of seats 31 are arranged in two rows extending in the fore and aft direction similarly as in the first embodiment. Similarly, the seats 31 in the different rows face away from each other or both face in the outboard direction. As opposed to the first embodiment, the seats 31 are supported by support poles 37 that extend between the floor 6 and the roof 15 and support the seats 31 at intermediate points thereof. Each support pole 37 may be curved or bent in intermediate parts thereof. The parts of the support poles 37 extending above the seat 31 may be used as hand rails for passengers seated in any of the seats 31 or leaning against the seats 31. The poles 37 allow the seats 31 to be highly securely attached to the vehicle body. The poles 37 are located between the adjoining seats 31 so as not to hamper the passenger in seating and unseating from the seat 31.

In this case also, at least one of the support poles 37 may be detachably attached to the floor 6 and the roof 15 so that the support pole 37 along with the seat cushion 32 or seat cushions 32 may be removed from the cabin 5. Thereby, extra space can be created for placing luggage or a wheel chair, as required.

Figure 7A:
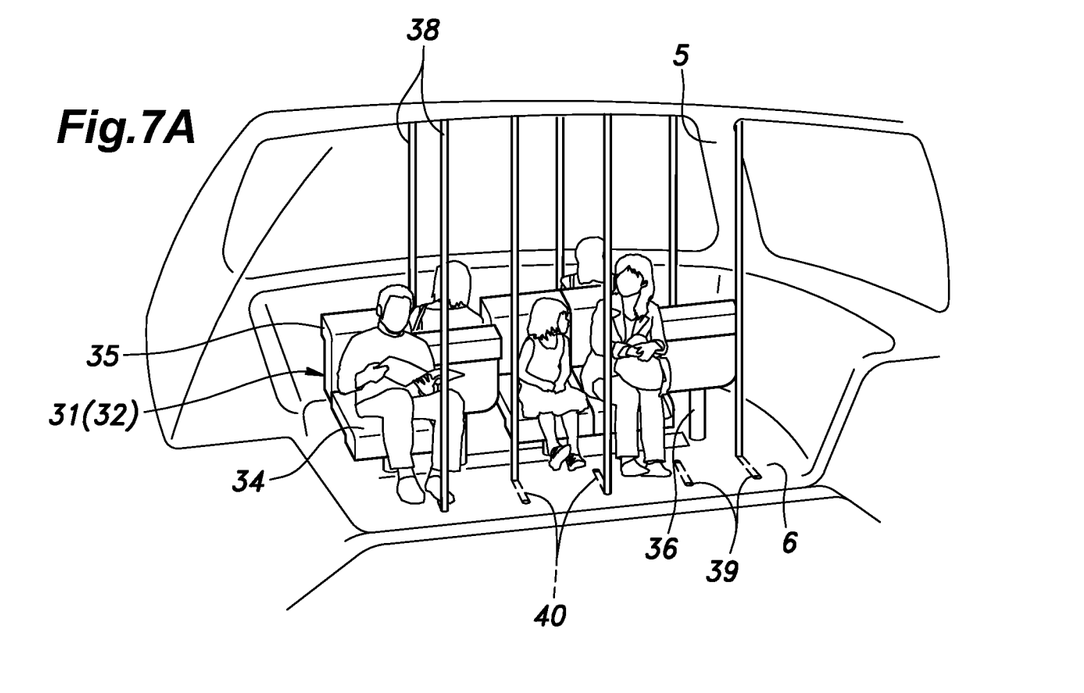
FIG. 7A is a see-through perspective view of the cabin according a third embodiment of the present invention.
Figure 7B:
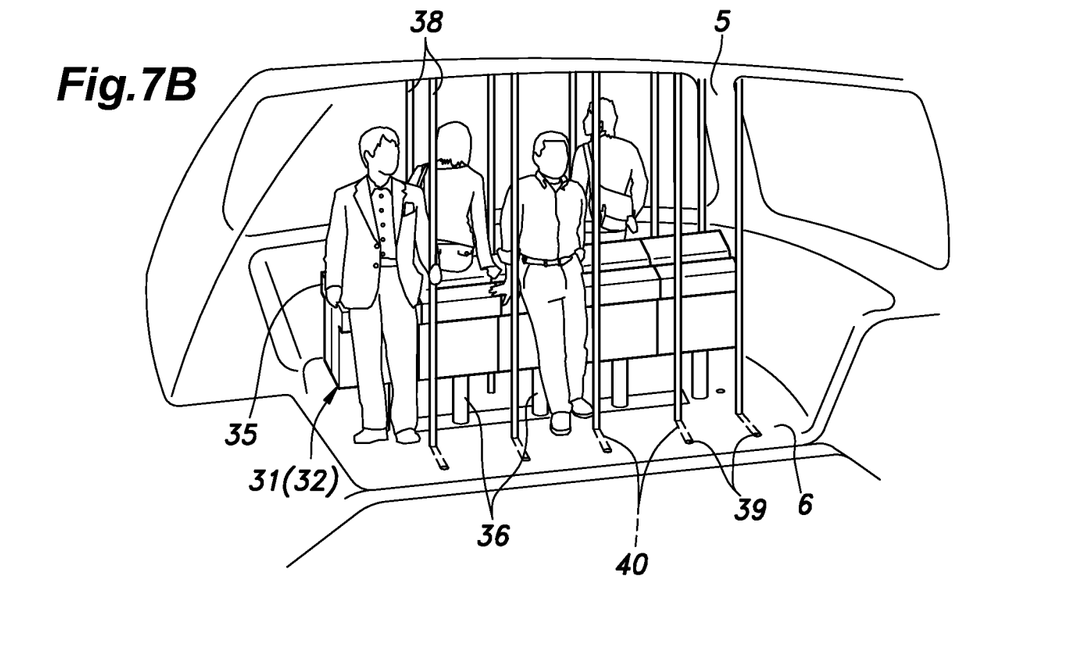
FIG. 7B is another see-through perspective view of the cabin according the third embodiment.

FIGS. 7A and 7B show a third embodiment. In this embodiment, the seats 31 are supported by short poles 36 similar to the poles 36 used in the first embodiment illustrated in FIG. 1. Additionally, a plurality of linear long poles 38 extend between the floor 6 and the roof 15 in a detachable manner. Therefore, by rearranging and/or removing at least a part of the long poles 38, a space may be created in the cabin 5 for a passenger on a wheelchair to board the vehicle. In this case, the long poles 38 are provided separately from the seats 31.

The long poles 38 may be conveniently used as hand rails for passengers standing or leaning against the seats 31. In particular, each long pole 38 can be positioned at a first position which is slightly outboard of the free end of the extension 35 of the corresponding seat 31 in the flipped-up position, and a second position which is somewhat on an outboard side of the first position. Preferably, the first position and the second position are laterally aligned with each other, and these positions are located between the adjoining seats with respect to the fore and aft direction so as not to hamper the seating and unseating of the passengers.

Each long pole 38 may be positioned either in the first position or the second position by being inserted into holes 39 formed in the floor 6 and the roof 15, respectively, at the corresponding ends of the long pole 38. Alternatively or additionally, the floor 6 and the roof 15 may be provided with guide rails 40, respectively, so that each long poles 38 may be moved along the corresponding guide rail 40 between the first position and the second position, and fixedly secured at each position in a selective manner by using a suitable latch mechanism (not shown in the drawings).

Typically, when one of the seat cushions 32 is flipped up, the passenger seated on this seat cushion 32 (the extension 35) is located in a relatively inboard position. Therefore, in such a case, it is advantageous to position the adjacent long pole 38 at the first position for the passenger to use the long pole 38 as a guide rail. On the other hand, when the seat cushion 32 is in the seating position, the passenger seated on this seat cushion 32 (the seating surface 34) is located in a relatively outboard position. Therefore, in such a case, it is advantageous to position the adjacent long pole 38 at the second position for the passenger to use the long pole 38 as a guide rail.

The present invention has been described in terms of specific embodiments, but is not limited by such embodiments, and can be modified in various ways without departing from the spirit of the present invention. For instance, the vehicle 1 may not be an autonomous vehicle. In such a case, a driver's seat may be provided at the front, or the vehicle may be used a trailer that can be hitched to a tractor or any other pulling vehicle. In various embodiments, the seat back may be provided for each seat or may be absent depending on the situation. The poles in the various embodiments may be configured to be either fixed or detachable depending on the particular need.

The invention claimed is:

1. A vehicle comprising a plurality of seats arranged in a fore and aft direction in middle part in a lateral direction of a cabin of the vehicle, each seat facing laterally outward, wherein each seat is provided with a seat cushion that can be rotated about a rotational axis extending laterally at an inner end part thereof in the lateral direction between a seating position where a seating surface of the seat cushion faces substantially upward, and a flipped-up position where the seat cushion extends substantially vertically,
wherein each seat cushion is provided with an extension extending downward from an outer edge thereof in the lateral direction at the seating position.

2. The vehicle according to claim 1, wherein the seats are arranged in two rows positioned laterally next to each other.

3. The vehicle according to claim 1, wherein each seat cushion is supported by a pole extending from a floor to the seat cushion.

4. The vehicle according to claim 3, wherein the pole is detachably attached to the floor so that the corresponding seat cushion and the pole can be selectively removed from the cabin.

5. The vehicle according to claim 1, wherein each seat cushion is supported by a pole extending between a floor and a roof of the cabin.

6. The vehicle according to claim 5, wherein the pole is detachably attached to the floor and the roof so that the corresponding seat cushion and the pole can be selectively removed from the cabin.

7. The vehicle according to claim 1, further comprising a pole extending between a floor and a roof of the cabin, the pole being detachably attached to the floor and the roof.

8. The vehicle according to claim 7, wherein the pole is provided between the seat cushions that adjoin each other in the fore and aft direction.

9. The vehicle according to claim 8, wherein the pole is configured to be selectively positioned in a first position and a second position located on an outer side in the lateral direction of the first position.

10. The vehicle according to claim 1, wherein the vehicle is an autonomous driving vehicle.

* * * * *